(12) United States Patent
Low et al.

(10) Patent No.: US 8,213,337 B2
(45) Date of Patent: Jul. 3, 2012

(54) IP MULTIMEDIA SUBSYSTEM FOR A MULTIMODE WIRELESS DEVICE

(75) Inventors: Su-Lin Low, San Diego, CA (US); Hausting Hong, San Diego, CA (US)

(73) Assignee: VIA Telecom, Inc., San Diego, CA (US)

( * ) Notice: Subject to any disclaimer, the term of this patent is extended or adjusted under 35 U.S.C. 154(b) by 287 days.

(21) Appl. No.: 12/565,058

(22) Filed: Sep. 23, 2009

(65) Prior Publication Data

US 2011/0069635 A1 Mar. 24, 2011

(51) Int. Cl.
*H04L 12/28* (2006.01)
(52) U.S. Cl. ............... 370/254; 370/328; 370/395.21
(58) Field of Classification Search .......... 370/315, 370/331, 338, 235, 395.21; 709/220, 223
See application file for complete search history.

(56) References Cited

U.S. PATENT DOCUMENTS

| | | | |
|---|---|---|---|
| 2002/0091802 A1* | 7/2002 | Paul et al. | 709/220 |
| 2007/0201366 A1* | 8/2007 | Liu | 370/235 |
| 2008/0107119 A1* | 5/2008 | Chen et al. | 370/395.21 |
| 2008/0254795 A1* | 10/2008 | Ratcliffe et al. | 455/435.1 |
| 2009/0175239 A1* | 7/2009 | Grinshpun et al. | 370/331 |
| 2010/0103862 A1* | 4/2010 | Ulupinar et al. | 370/315 |

* cited by examiner

*Primary Examiner* — Robert Wilson
*Assistant Examiner* — Mohamed Kamara
(74) *Attorney, Agent, or Firm* — Richard K. Huffman; James W. Huffman

(57) ABSTRACT

System and method for managing connections in a mobile device. A first application may be executing on the mobile device. A first application request, including first quality of service (QOS) parameters and first connection information for the first application, may be received. The first QOS parameters and the first connection information may be stored in a routing table. A first connection for the first application may be established based on the first QOS parameters and the first connection information. A second application may be executing on the mobile device. A second application request, including second QOS parameters and second connection information for the second application, may be received. The second QOS parameters and the second connection information may be stored in the routing table. A second connection for the second application may be established based on the second QOS parameters and the second connection information.

16 Claims, 8 Drawing Sheets wireless device 100

| App | Port Id (AT) | IPFlowId (Rev, Fwd) | QOSFlowProfileId | RLPId (Rev) | RLPId (Fwd) | Mac Flow | PDNId |
|---|---|---|---|---|---|---|---|
| Best Effort (PPP-framed) | * | 0xff | BE | 0 | 0 | 1 | 0xf |
| Best Effort (PPP-free) | * | 0xfe | BE | 1 | 1 | 1 | 0xf |
| SIP | a | 0xf1 | Conversational Media Signaling | 2 | 2 | 2 | 0xf |
| RTP_VoIP | b | 0xf2 | Conversational Speech RS1 | 3 | 3 | 3 | 0xf |
| RTP_Video | c | 0xf3 | Streaming Video | 4 | 4 | 4 | 0xf |
| Best Effort (PPP, Ipv4) | * | 0x21 | BE | 0 | 0 | 1 | 2 |
| ... | | | | | | | |

FIG. 3

| RLPId | RoHC CID – Fwd | Fwd IMS Route | RoHC CID – Rev | Rev Modem Route |
|---|---|---|---|---|
| 0 (BE-ppp) | - | PPP | - | EMPA |
| 1 (BE-pppFree) | - | IP | - | EMPA |
| 2 (SIP) | - | IP | - | EMPA |
| 3 (RTP_VoIP) | 1 | ROHC | 2 | ROHC |
| 4 (RTP_Video) | - | IP | - | EMPA |
| ... | | | | |

FIG. 4

IP MULTIMEDIA SUBSYSTEM FOR A MULTIMODE WIRELESS DEVICE

FIELD OF THE INVENTION

The present invention relates generally to wireless communication and particularly to the management of connections in a multimode wireless device.

DESCRIPTION OF THE RELATED ART

Wireless communication, and in particular packet based wireless communication, has become increasingly widespread in recent years. As various technologies and protocols compete, develop, spread, and replace or phase out old technologies, the coverage and function of different wireless technologies can be overlapping and complementary. Accordingly, it is becoming desirable to implement wireless devices which are capable of utilizing multiple wireless technologies and protocols.

One way of implementing multiple technologies in a wireless device involves an IP Multimedia Subsystem (IMS). An IMS interfaces between the user interface level and the protocol stacks of the wireless technologies in a wireless device. The IMS thus transports the IP packets over one or another of the wireless technology modems in the wireless device to communicate with the corresponding network.

If the maker of a modem for a first wireless communication technology (e.g., HRPD/EHRPD) wants to build their modem in such a way as to be IMS capable, they must invest in the development effort of an IMS call stack. If the maker already has IMS call stack capabilities, and desires that their modem be capable of interoperating with the modem of a second wireless communication technology (e.g., LTE), they need to integrate and customize their IMS call stack to either interoperate with the second modem's IMS call stack, or use their IMS call stack as a common stack for both technologies. In either case, significant customization and/or adaptation is required to realize the solution. This is because the call control link setup, Serving Gateway Packet Network connectivity, radio QOS configuration and negotiation procedures with the modem protocol stacks are different for each technology. In particular, the radio QOS configuration parameters and negotiation procedures for each technology are intimately tied with a modem protocol stack's parameters and procedures at the lower transport layers.

As another possible solution, the maker of the modem of the first wireless technology could consider not implementing IMS call stack capabilities, but could instead plan on integrating with the modem of the second wireless technology and using its IMS call stack. This case, however, would still require significant custom development work to integrate the first wireless technology modem with the IMS call stack of the second wireless technology modem.

In contrast, a maker of a multi-mode modem (e.g., implementing both a first wireless technology and a second wireless technology in a first modem) would typically build a single IMS call stack for its wireless technologies. However, in this case, the IMS call stack is typically proprietary and customized, and cannot be ported to any other wireless modem easily. Additionally, such a modem would still be difficult to integrate with another wireless technology (e.g., a third wireless technology implemented in a second modem) in a wireless device designed to include multiple modems.

Taking all of the above into consideration, it is apparent that current solutions with respect to integrating multiple wireless communication technologies in a single wireless device are inadequate. Accordingly, improvements in the field are desirable.

SUMMARY OF THE INVENTION

Various embodiments of a method for managing connections in a mobile device are presented herein. The method may be implemented by an IP multimedia subsystem (IMS), including, for example, a processor and a memory medium coupled to the processor. In this case the memory medium may store a routing table as well as program instructions executable by the processor to implement the method. Additionally, the method may be implemented as a wireless (e.g., mobile) device, e.g., a system including a plurality of modems, and an IMS coupled to the plurality of modems. In this case, the IMS may again include a processor coupled to a memory medium, where the memory medium stores a routing table and program instructions executable by the processor to implement the method. The method may operate as described below.

A first application request may be received. The first application request may include first quality of service (QOS) parameters and first connection information for a first application. The first application may be executing on the mobile device. The first application may include either telephonic communication, data communication, or in some embodiments, both telephonic and data communication. The first QOS parameters and the first connection information may be stored in a routing table. A first connection for the first application may be established based on the first QOS parameters and the first connection information. Establishing the first connection for the first application may include utilizing a first communication technology (e.g., a wireless communication technology) based on the first connection information. For example, the first communication technology may be 1xRTT, HRPD/EHRPD, LTE, or any other communication technology. The first communication technology may be implemented by a first modem of the mobile device. Establishing the first connection for the first application may include utilizing a generic API to communicate with the first modem.

Establishing the first connection may include establishing QOS parameters for the first connection. Although the established QOS parameters may be based on the requested QOS parameters (the first QOS parameters), they may not be identical. Accordingly, the first QOS parameters in the routing table may be modified based on the actual QOS parameters established while establishing the first connection. In other words, the information in the routing table may be modified based on the actual QOS parameters obtained in establishing the first connection.

A second application request may be received. The second application request may include second QOS parameters and second connection information for a second application. It should be noted that the second QOS parameters and the second connection information may be different from the first QOS parameters and the first connection information. The second application may be executing on the mobile device. The second application, similar to the first application, may include telephonic communication, data communication, or both telephonic and data communication. The second QOS parameters and the second connection information may be stored in the routing table. A second connection for the second application may be established based on the second QOS parameters and the second connection information. Establishing the second connection for the second application may include utilizing a second communication technology (e.g., a wireless communication technology) based on the second connection information. For example, the second communication technology may be 1xRTT, HRPD/EHRPD, LTE, or any other communication technology; it should be noted that the second communication technology may be a different communication technology than the first technology, although it is also possible that they may be the same communication technology. The second communication technology may be implemented by a second modem of the mobile device. Establishing the second connection for the second application may include utilizing the generic API to communicate with the second modem. In other words, the same generic API may be used to communicate with both the first modem and the second modem.

It should be noted that the second modem may be a different modem than the first modem, e.g., if the second communication technology is different from the first communication technology; however, it is also possible that both the first and second communication technologies may be implemented on a single modem, in which case the first modem and the second modem may be the same modem.

As described with respect to the first connection, establishing the second connection may also include establishing QOS parameters for the second connection. Again, although the established QOS parameters may be based on the requested QOS parameters (the second QOS parameters), they may not be identical. Accordingly, the second QOS parameters in the routing table may be modified based on the actual QOS parameters established while establishing the second connection. Thus, as in the case of the first connection, the information in the routing table may be modified based on the actual QOS parameters obtained in establishing the second connection.

BRIEF DESCRIPTION OF THE DRAWINGS

The foregoing, as well as other objects, features, and advantages of this invention may be more completely understood by reference to the following detailed description when read together with the accompanying drawings in which:

FIG. 3 is an exemplary QOS Flow Routing Table according to one embodiment;

FIG. 4 is an exemplary Modem Radio Link Routing Table according to one embodiment;

Figure 1:
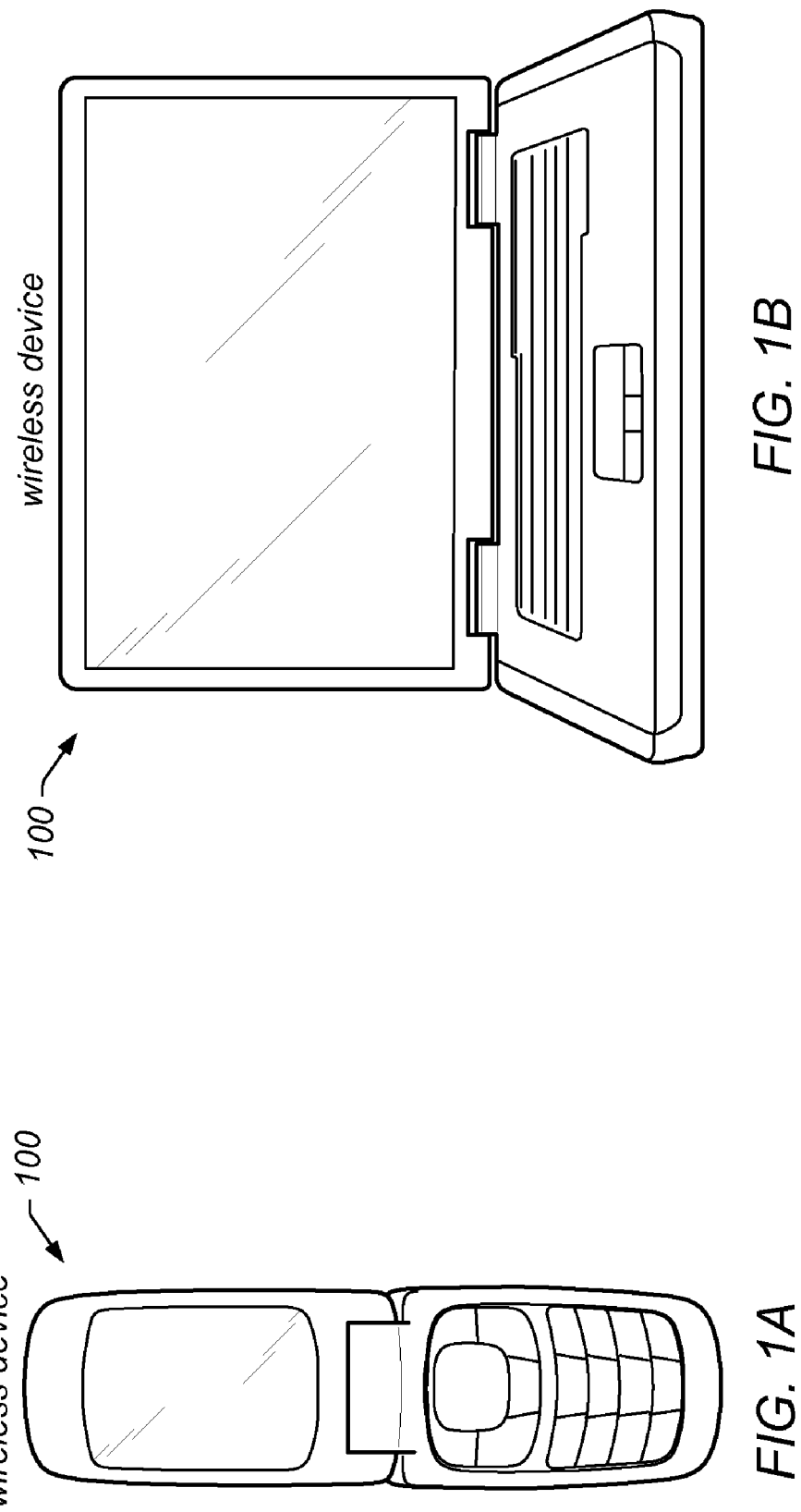
FIGS. 1A and 1B are illustrations of exemplary wireless devices according to various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE EMBODIMENTS

FIGS. 1A and 1B

Exemplary Wireless Devices

FIGS. 1A and 1B illustrate exemplary embodiments of a wireless device 100. As shown, the wireless device 100 may be a wireless phone (e.g., a cell phone, smartphone, etc.), as shown in FIG. 1A, or may be a mobile computer (e.g., a laptop), as shown in FIG. 1B. Additionally, the wireless device 100 could be any of a number of other devices, such as a personal digital assistant, a handheld television, or a global positioning system (GPS) device, among other possible devices.

The wireless device 100 may be a multimode wireless device. In other words, the wireless device may be able to communicate (either in a wired or a wireless manner) with one or more access networks via different communication technologies. For example, according to various embodiments, the wireless device 100 may be able to communicate using two or more communication technologies, such as 1xRTT, HRPD/EHRPD, LTE, GSM, UMTS, WiMAX, WLAN, and/or any other communication technologies. In one embodiment, the wireless device 100 may include modems for some or all of the communication technologies with which it is configured to communicate; for example, there may be a modem for each supported communication technology, or alternatively, two or more communication technologies may be implemented in a single modem in the wireless device 100. It is also possible to combine one or more such multi-mode modems with one or more single-mode modems.

The wireless device 100 may include an IMS subsystem for interfacing with each communication technology with which it is configured to communicate. The IMS subsystem may include a processor and a memory medium, where the memory medium stores a routing table and program instructions for implementing various functions. It should be noted that the IMS may be implemented on any of a variety of platforms, as desired. For example, the IMS subsystem may be implemented discretely, with its own separate processor and/or memory, or may be integrated with another function in a wireless device, e.g., with a modem subsystem, in which case the IMS may share a processor with a modem.

The wireless device 100 may execute a variety of user applications that perform various functions. The applications may require a connection to a packet data network (PDN) in order to implement some or all of their functions. For example, the wireless device may include applications with functionality for web browsing, email, voice over IP (VoIP), online games, etc. In various embodiments, different applications may require or prefer to connect to different networks, and/or may have different quality-of-service (QOS) requirements for their connections. Thus, when a user initiates such an application, the wireless device 100 may need to establish a connection to a network for the application according to its preferred QOS parameters and PDN connectivity information. The IMS layer of the wireless device 100 may serve to interface with both a user interface (UI) layer, with which a user may interact with the applications, and a modem layer, in order to establish connections for any applications executing on the wireless device 100.

For example, a user may use an application (including initiating or terminating the application) through the (UI), while the IMS interfaces with both the UI and the various communication technologies in the wireless device to establish, maintain, and/or terminate connections for the applications as appropriate. Further details, including an exemplary system architecture, are shown in FIG. 2 and described below.

FIG. 2

Exemplary Wireless Device System Architecture

Figure 2:
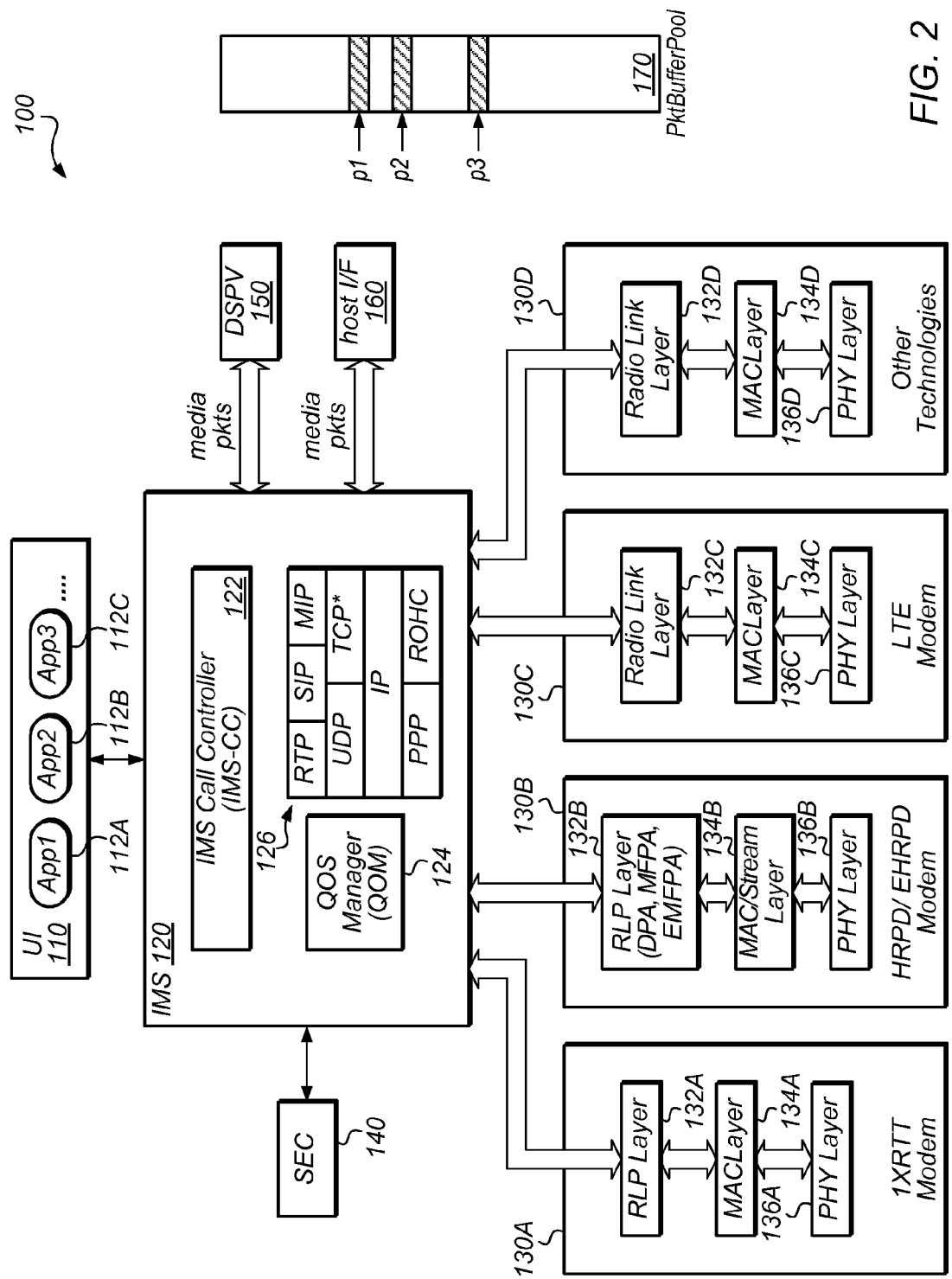
FIG. 2 is a architectural diagram of a wireless device according to one embodiment.

FIG. 2 is a diagram illustrating an exemplary system architecture for a wireless device such as the wireless device 100 shown in FIG. 1 and described above. The system architecture shown in FIG. 2 and described below represents one possible embodiment of a system architecture, however, it will be apparent to those skilled in the art that any number of variations and alternate implementations may also be possible.

The wireless device 100 may include a user interface (UI) 110, an IP multimedia subsystem (IMS) 120, and one or more modems 130. Each modem may implement one or more communication technologies; for example, there might be a 1xRTT modem 130A, an HRPD/EHRPD modem 130B, an LTE modem 130C, and/or a modem for any other technology 130D. The wireless device 100 may also include a Security Subsystem (SEC) 140, a DSPV 150 and/or host interface 160, and a packet buffer pool 170.

The UI 110 may include a plurality of applications 112. Each application 112 may provide one or more functions for a user of the wireless device 100; for example, there might be applications for web browsing, on-line games, voice over IP (VoIP), email clients, file transfer protocol (ftp), secure shell (ssh) protocol, and/or other protocols or applications such as testing applications. Each application may require a network connection, e.g., a connection to a packet data network (PDN), in order to perform some or all of its functionality.

The IMS 120 may include an IMS call controller (IMS-CC) 122, a quality-of-service (QOS) manager 124, and a set of IMS data stacks 126. In a preferred embodiment, the data stacks 126 may include Point-to-Point Protocol (PPP), Internet Protocol (IP), User Datagram Protocol (UDP), Transmission Control Protocol (TCP), Mobile IP (MIP), Real-Time Protocol (RTP), Session Initiation Protocol (SIP), Session Description Protocol (SDP), and Robust Header Compression (ROHC). In other embodiments, there may be a different set of data stacks 126, e.g., including fewer or more data stacks, and/or one or more data stacks for other protocols instead of or in addition to those shown. It should be noted that the IMS subsystem 120 may also include one or more components in addition to those shown, as desired.

Each modem 130 may have its own protocol stack, which may include an RLP or Radio Link layer 132, a Media Access Control (MAC) layer 134, and a physical (PHY) layer 136.

If an application 112 in the UI 110 needs to establish a connection, for example, it may interface with the IMS 120 to set up the desired IP flows necessary for the application 112, and its associated QOS parameters and PDN connectivity information. The IMS may negotiate (e.g., with a PDN via a modem 130) the QOS configuration for each IP flow, and use Session Initiation Protocol (SIP) signaling to establish IMS call connections.

The IMS may interface with the modems 130 (e.g., may interface with the RLP or Radio Link layer 132 of the modem protocol stacks) to transfer data packets between the lower layers and the IMS stack. In one embodiment, the IMS may implement a generic interface (e.g., a generic API) which may be adaptable to interface with the protocol stack of any modem technology.

The IMS 120 and the modems 130 may share a common packet buffer pool 170. The packet buffer pool 170 may buffer packet data between the modem layer(s) and the IMS layer, potentially reducing memory requirements and data transfers, and saving processing of MIPs.

Once the IMS 120 establishes a call connection, if media packets are received on that connection, they may be processed by the RTP module in the IMS 120 and routed to the DSPV 150 or host interface 160 for playout.

As mentioned above, different applications may have different connection needs or preferences. In addition, each application may have different IP flows with different QOS profiles, for example, for applications with multiple flows of different QOS priorities. The QOS Manager (QOM) 124 manages the multiple IP flows' QOS profiles, routing, and PDN connectivity. The QOM 124 may include a QOS flow routing table (an example of which is shown in FIG. 3) and a modem radio link routing table (an example of which is shown in FIG. 4). Thus, when the IMS 120 receives a connection request from an application 112, including specific connection information and QOS parameters for the connection, the information may be stored by the QOM 124 and used by the IMS 120 to establish the connection for the application 112.

FIG. 3

QOS Flow Routing Table

As noted above, the QOM may store a QOS flow routing table such as the one shown in FIG. 3. A QOS flow routing table may include QOS and routing information for each IP reservation flow for each IMS application. For example, when an application first starts or first desires to use a particular IP flow, it may pass its desired QOS flow profile information, PDNId, and other QOS parameters to the IMS subsystem. Other data (e.g., parameters or routing information) may also be included in the QOS flow routing table, as desired. The QOM may then store this QOS information in the QOS flow routing table. Since each IP flow for each application may have different QOS and connection information, the QOS flow routing table may store such information for a plurality of applications and/or IP reservation flows.

In some embodiments, the QOM may be configured to store both 3GPP2 and 3GPP QOS formats, and may be able to convert between these two when negotiating with the appropriate network technology type. For example, if at some point a given application specifies a first network technology (e.g., a 3GPP2 technology), including QOS parameters according to the first network technology format, but only a second network technology (e.g., a 3GPP technology) is available at that point, the QOM may be able to convert the QOS parameters to the second network technology format in order to request the appropriate QOS level using the second network technology.

The IMS may use the information in the QOS flow routing table in order to establish connections for the applications executing on the wireless device. In other words, the IMS may use this information in order to negotiate and configure QOS settings with the network. After QOS configuration and negotiation, the QOM may update the information in the QOS flow routing table based on the configuration. For example, if the actual QOS available differs from the requested QOS, the QOM may update the table to reflect the actual QOS parameters. Thus, each IP reservation or IP flow may be configured with a specific QOS profile, and may be associated with a modem transport layer Radio Link Flow at the modem protocol stack.

FIG. 4

Modem Radio Link Routing Table

As noted above, the QOM may also include a modem radio link routing table, such as the one shown in FIG. 4. A modem radio link routing table may include routing information for radio link flows (e.g., radio link flows associated with one or more IP flows). For example, as shown in FIG. 4, a radio link routing table could include a unique Radio Link Flow ID (RLPId) (e.g., an ID specific to a given application or technology), the ROHC instance associated with that radio link (if applicable), and the forward and reverse Route path information between the IMS and modem. Other information may also be included in the QOS flow routing table, as desired. These parameters may be updated once QOS configuration and negotiation has been established for a radio link flow associated with one or more IP flows.

The forward IMS route may indicate the destination of the packets that arrive at the IMS subsystem from the modem subsystem, for a specific RLP Link Flow.

The reverse Modem route may indicate the destination of the IP packets when they leave the IP layer in the IMS subsystem, for a specific RLP Link flow.

It should be noted that although the QOM is described above with respect to FIGS. 2-4 as storing two routing tables (e.g., a QOS Flow Routing Table and a Modem Radio Link Routing Table), this is not intended to be limiting. For example, in some embodiments there may be a single routing table, while in other embodiments there may be additional routing tables.

FIG. 5

Method for an IMS Call Controller to Establish a Connection

Figure 5:
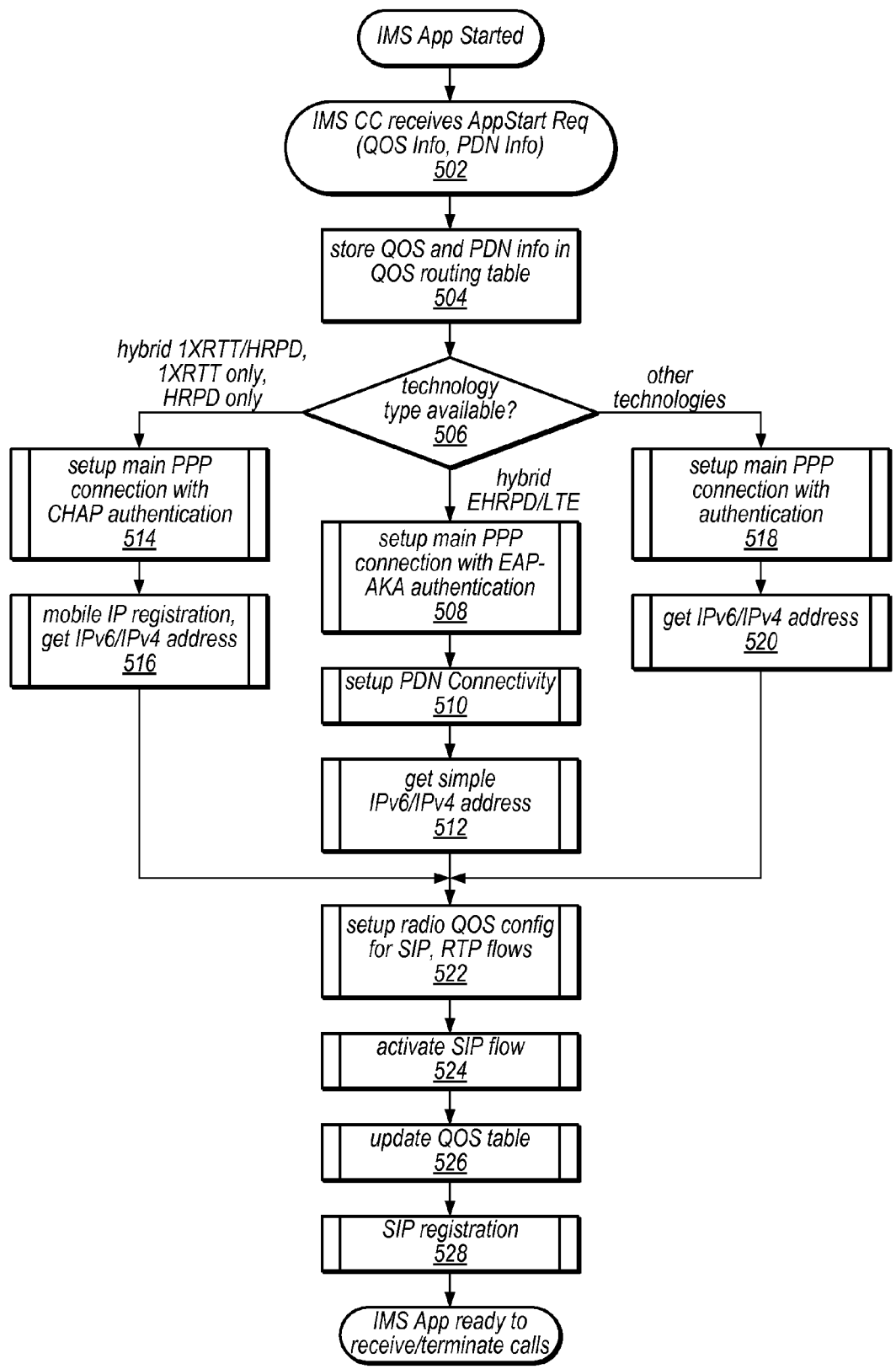
FIG. 5 is a diagram illustrating an method for an IMS call controller to establish a connection according to one embodiment.

FIG. 5 is a flowchart diagram illustrating a method for the IMS call controller (IMS-CC) to establish a connection for an IMS application that is started from the user interface. Although the call flow described below represents an exemplary embodiment of the system and method presented herein, numerous possible modifications and variations will be apparent to those skilled in the art. For example, according to various embodiments, one or more steps may be omitted, repeated, or performed in a different order than shown. Additional steps may also be inserted as desired.

In 502, the IMS-CC receives a first application request (AppStart Req) from a first application that includes desired QOS parameters and packet data network (PDN) connectivity information.

In 504, the received QOS and PDN parameters are stored in a QOS Routing Table. An exemplary QOS Routing table is shown in FIG. 3 and described above with respect thereto. An entry for the application may also be added to a Modem Radio Link Routing Table (e.g., as shown in FIG. 4 and described with respect thereto), in some embodiments.

In 506, the IMS-CC decides how to establish the PDN connectivity, the authentication method, and the IP address configuration, depending on the technology type(s) available. For example, if the mobile device is operating as a hybrid EHRPD/LTE device (e.g., if the mobile device is in a coverage area where these are the available technology types), the IMS-CC may follow steps 508-512. Alternatively, if the mobile device is operating as a hybrid 1xRTT/HRPD device, or using 1xRTT only, or using HRPD only, the IMS-CC may follow steps 514-516. If some other technology or technologies are available, the mobile device may follow steps 518-520.

In 508, in which the mobile device is operating as a hybrid EHRPD/LTE device, the IMS-CC sets up the main PPP connection with Extensible Authentication Protocol for UMTS Authentication and Key Agreement (EAP-AKA) authentication.

In 510, the IMS-CC sets up PDN connectivity with the default PDN in the network.

In 512, the IMS-CC configures the mobile device with an IPv4 or IPv6 address assigned by the network.

In 514, in which the mobile device is operating as hybrid 1XRTT/HRPD device, or using 1XRTT only, or using HRPD only, the IMS-CC sets up the main PPP connection with Challenge-Handshake Authentication Protocol (CHAP) authentication.

In 516, the IMS-CC performs Mobile IP (MIP) registration, and obtains an IPv4 or IPv6 address.

In 518, in which the mobile device is operating using another technology or combination of technologies, the IMS-CC sets up the main PPP connection with an appropriate form of authentication (e.g., CHAP, EAP-AKA, or any other form of authentication, as appropriate).

In 520, the IMS-CC obtains an IPv4 or IPv6 address as appropriate for the technology or technologies used.

In 522, the QOM triggers the modem protocol stack to negotiate for the desired radio QOS for the SIP and RTP IP flows, as well as for their associated modem transport RLP Link flows and MAC layer flows.

In 524, the SIP flow is activated so that SIP registration can begin for the IMS application.

In 526, after QOS negotiation, the QOM updates the QOS and RLP routing tables with the negotiated values, and updates the forward and reverse routing information.

In 528, SIP registration takes place. Once SIP registration is successful, the IMS application may be ready to originate or terminate calls with SIP invite sessions.

The method described above may be repeated as desired for additional application requests. For example, if a second application request is received, including second QOS parameters and connection information for a second application (e.g., a different application than the first application), the second QOS parameters and connection information may also be stored in the QOS flow and/or Modem Radio Link Routing Table and used to establish a second connection for the second application, just as described above and shown in FIG. 5.

FIG. 6

Start Call Flow

Figure 6:
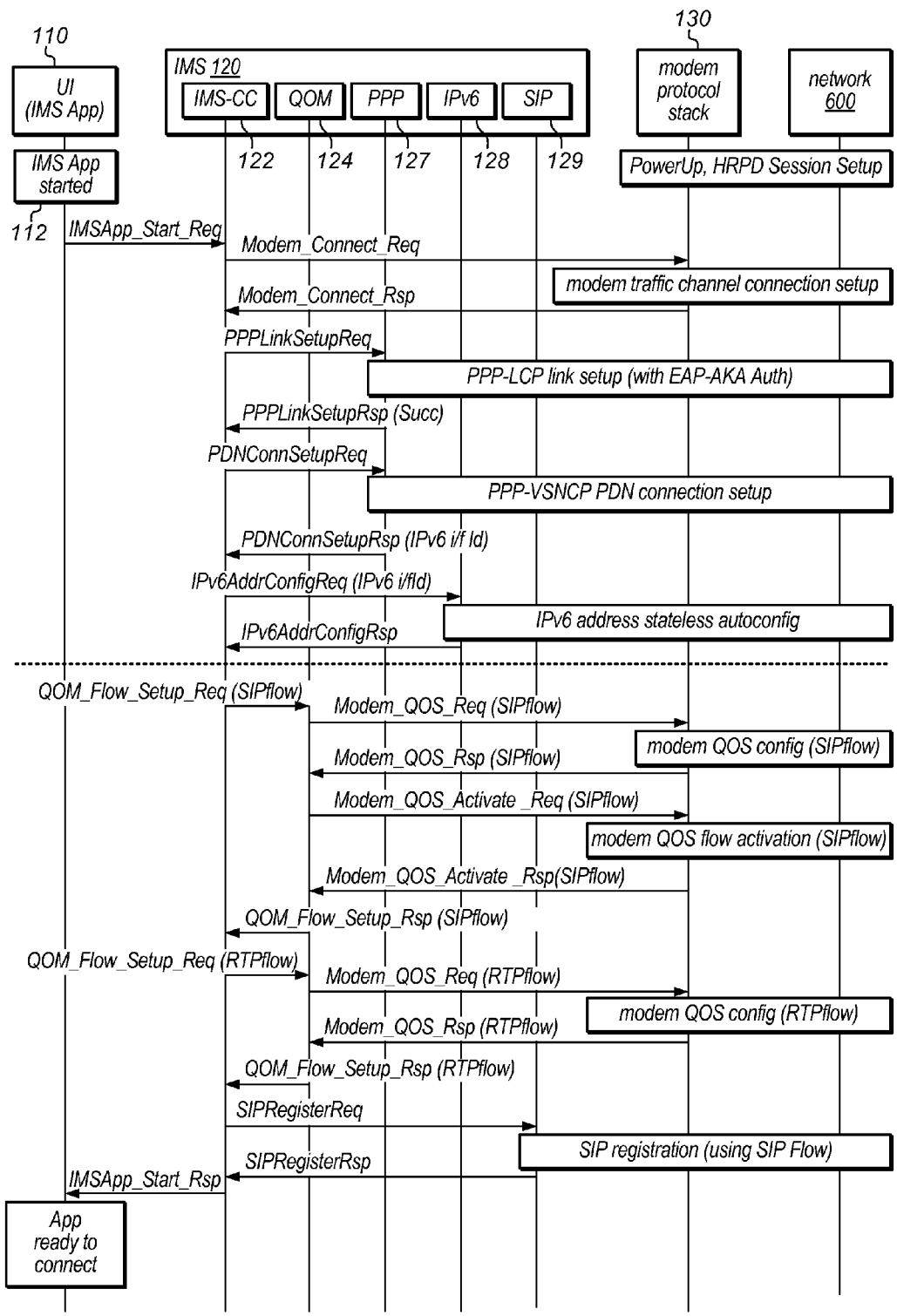
FIG. 6 is a diagram illustrating an exemplary IMS-Modem Application "start call" flow according to one embodiment.

FIG. 6 illustrates an exemplary call flow for an IMS application (such as a VoIP application) starting on an EHRPD system. As previously described, the IMS-CC may communicate with any modem protocol stack using a set of generic API interface messages. FIG. 6 is an example of how the IMS-CC might use generic interface messages with an EHRPD Modem protocol stack to setup a PPP connection, PDN connectivity, obtain an IP address, trigger radio QOS configuration and activation, and start SIP registration. Note that this embodiment is exemplary only and variations of configurations and processes are envisioned.

When an IMS application 112 is started at the user interface 110, a message indicating that the application 112 wants to connect to the network 600 may be sent to the IMS-CC 122 in the IMS 120. The IMS may send a message (e.g., a generic API interface message) to the modem (e.g., to the modem protocol stack) 130. The modem 130 may then set up a modem traffic channel connection with the network 600, and return a message indicating that the connection was successful to the IMS-CC 122. The IMS-CC may then interface with the PPP data stack 127 to set up a PPP-LCP link with EAP-AKA Authentication with the network 600 (e.g., via the modem 130), and also to set up a PPP-VSNCP PDN connection with the network 600 (e.g., via the modem 130). The IMS-CC 122 may then interface with the IPv6 data stack 128 as shown to request, receive, and set up an IPv6 address with the network 600 (e.g., via the modem 130).

At this point (e.g., where the flow is separated by a dotted line in FIG. 6), the wireless device 100 may be "attached" to the network; that is, the wireless device 100 has been authenticated, an IP address has been obtained, and access to the network has been granted. The IMS-CC 122 may next interface with the QOM 124 to request and configure QOS parameters for the SIP flow. As a result, the QOM 124 may exchange messages with the modem 130 to trigger the modem to configure and activate the QOS parameters for the SIP flow with the network 600. The IMS-CC 122 may similarly interface with the QOM 124, which may exchange messages with the modem 130, to configure QOS for the RTP flow with the network 600. The IMS-CC may then interface with the SIP data stack 129 to trigger SIP registration with the network 600 (e.g., via the modem 130) using the newly established SIP flow. At this point, the IMS-CC 122 may return a message to IMS application 112 indicating that a connection has been established, and the application 112 may be ready to connect to the network 600.

As described above, the IMS-CC 122 may use a set of generic interface messages for interfacing with the modem 130. Some such messages are shown in FIG. 6; e.g., "Modem_Connect_Req", "Modem_Connect_Rsp", "Modem_QOS_Activate_Req", and "Modem_QOS_Activate_Rsp", are all examples of generic API interface messages according to one embodiment. A more complete list of generic interface definitions (according to one embodiment) that can be adapted to any 3GPP/3GPP2 technology is shown in the table below:

Although the set of generic messages defined in the above table represent one embodiment of the system and method described herein, it will be apparent that any number of other messages, including messages that are similar or different in function, and/or messages which are either generic to many technologies or specific to a particular technology or set of technologies, are also possible.

Figure 7:
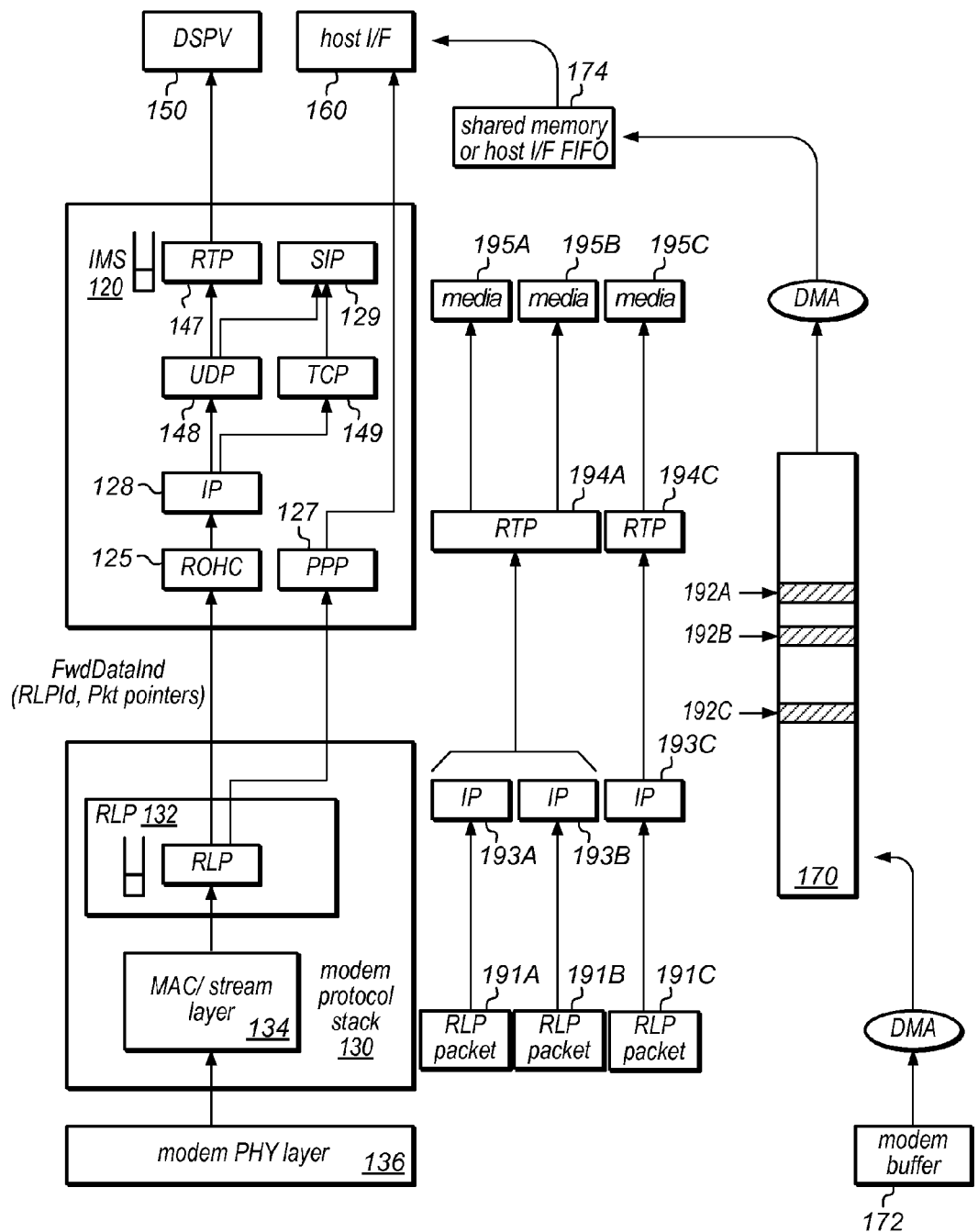
FIG. 7 is a diagram illustrating an exemplary forward data path flow according to one embodiment.
Figure 8:
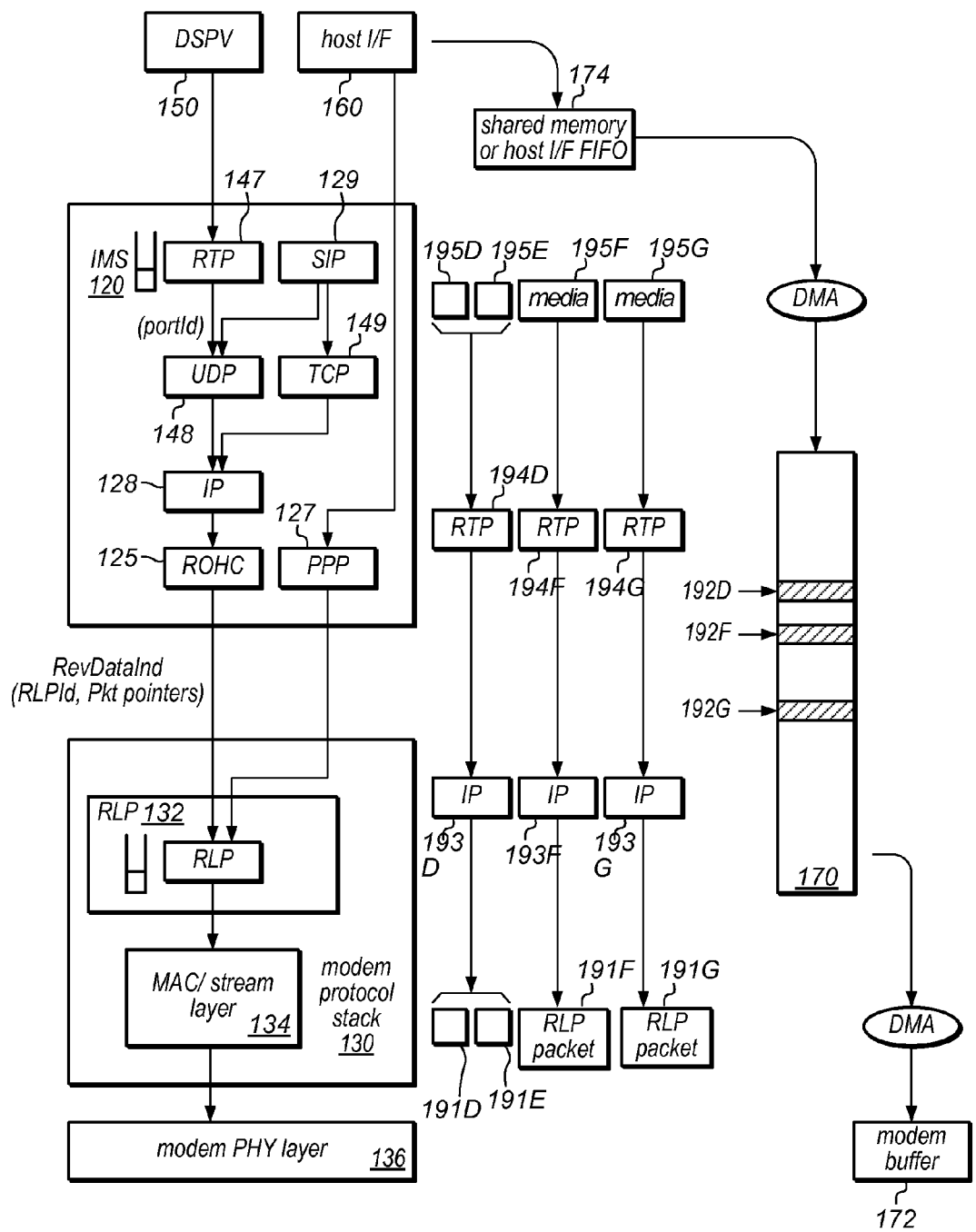
FIG. 8 is a diagram illustrating an exemplary reverse data path flow according to one embodiment.

FIGS. 7 and 8

Data Path Flows

As previously described, the IMS subsystem may provide a generic interface for the data path flows between a modem's protocol stack and the IMS subsystem. These data path flows may be applicable for all types of data, including RTP, SIP, ROHC, PPP, and other types of packets. FIG. 7 illustrates an example of the forward data path flow according to one embodiment, while FIG. 8 illustrates the reverse data path flow according to one embodiment. Note that these embodiments are exemplary only and variations of configurations and processes are envisioned.

In the forward (e.g., incoming) direction, the modem protocol stack may present the packets in the specified format to the IMS for forward routing. This may include the unique Radio Link Flow ID (RLPID), and the packet data pointers.

The modem PHY layer 136 may receive (e.g., to a modem buffer 172) packetized data from a network. For exemplary purposes, three RLP packets 191A-191C are shown in FIG. 7. The modem PHY layer 136 may send the data (e.g., from the modem buffer 172) to a common packet data buffer pool 170. For example, the packets 191A, 191B, and 191C may be transferred to locations 192A, 192B, and 192C respectively in the packet buffer pool 170. According to one embodiment, the data may be sent via a direct memory access (DMA) transfer, as shown. The MAC/stream layer protocols 134 may process the packet(s) and decode and remove any headers.

The RLP packets may be routed to the corresponding RLP instance (e.g., in the RLP protocol layer 132 of the modem 130) for RLP processing. This may include radio link protocol buffering and resequencing for that radio link flow. Each RLP packet may frame one or more IP/ROHC/PPP upper layer packets, depending on the transport modem technology and the configuration for that radio link flow. The RLP protocol layer 132 may thus decode the individual upper layer packets accordingly. The modem protocol stack 130 may then pass the packet data pointers to the IMS subsystem 120,

| API Interface Messages | Parameters | Purpose |
| --- | --- | --- |
| FwdDataInd | RlpId, Pkt Pointers | Deliver forward data from modem to IMS. |
| RevDataInd | RlpId, Pkt Pointers | Deliver reverse data from IMS to modem. |
| Modem_Connect_Req | | Triggers modem to setup a traffic channel connection. |
| Modem_Connect_Rsp | Result (success, fail) | Informs IMS that modem has setup a Traffic connection. |
| Modem_QOS_Config_Req | IPFlowId | Triggers modem to config and negotiate radio QOS params. |
| Modem_QOS_Config_Rsp | IPFlowId, RLPId, QOSProfileId, Result (success, fail) | Informs IMS that this Ipflow QOS are configured. |
| Modem_QOS_Activate_Req | IPFlowId | Triggers modem to activate the specified flow. |
| Modem_QOS_Activate_Rsp | IPFlowId, Result (success, fail) | Informs IMS that results are ready. | together with the RLPID for that link flow. In other words, because the packet buffer pool 170 is common to both the modem and the IMS, the RLP protocol 132 may be able to send the IMS 120 pointers to the packets, instead of the packets themselves. Using the RLPID, the IMS 120 may then look up the RLP routing table to find the destination for each packet.

If a packet is intended for the ROHC module 125, an ROHC instance ID may be obtained, and the packet may be routed to the relevant ROHC instance for header decompression, to obtain an IP packet. If a packet is a PPP packet, it may be routed to the PPP module 127 for HDLC decoding, to obtain an IP packet. If the packet is simply an IP packet, the packet may be routed to the IP module 128. Thus, at this point the exemplary RLP packets 191A-191C may be converted to IP packets 193A-193C.

The IP module 128 may decode the IP header(s) and route the IP packet(s) as appropriate. For example, each IP packet may be routed to UDP 148 or TCP 149 to be processed accordingly, then to RTP 147 or SIP 129, based on the protocol type and port ID in the IP header. The QOS routing table may also be consulted for routing if necessary.

If a packet is an RTP packet (e.g., including one or more media packet(s)), the RTP module 147 may decode the packet, and apply RTP resequencing and dejittering for playback. Thus, for example, the IP packets 193A-193C shown in FIG. 7 may be processed into RTP packets 194A and 194C, and further into media packets 195A-195C. If the packet is an SIP packet, the SIP module 129 may decode the packet for further SIP protocol processing.

Media packets (e.g., media packets 195A-195C) may then be routed (e.g., by a DMA, as shown) from the common packet buffer 170 to a shared memory 174 (e.g., a mailbox), from which DSPV 150 may pick up the data for media processing. Packets corresponding to legacy dialup connections may be routed to the host interface 160 in a first-in first-out manner.

In the reverse (e.g., outgoing) direction, the IMS may present the packets in a specified format to the modem protocol stack for reverse routing. This may include the RLPID, and the packet data pointers.

Data may be routed to the IMS subsystem 120. For example, DSPV 150 may write one or more media packets to a shared memory (e.g., a mailbox). The IMS 120 may then transfer the media packets (e.g., media packets 195D-195G) to the common packet buffer pool 170 (e.g., to locations 192D, 192F, 192G in packet buffer pool 170). Similarly, if the data arrives from the host interface 160 (e.g., corresponding to legacy dialup connections), the data may also be transferred to the packet buffer pool 170. The transfer may be a DMA transfer, as shown.

The IMS 120 may process and encode the data as appropriate for transmission. For example, each RTP packet (which may carry one or more media packets) may be encoded and transported over UDP/IP. For example, media packets 195D-195G may be encoded and processed to RTP packets 194D, 194F, 194G, and subsequently encoded and processed to IP packets 193D, 193F, 193G. SIP packets may be encoded and transported over UDP or TCP over IP.

The IMS 120 may look up the reverse path route for a packet in the RLP routing table. For example, a packet may be routed to a specified ROHC instance in the ROHC module 125. The ROHC module 125 may then apply header compression to the packet, and send the packet to an RLP instance in the radio link protocol layer 132 in the modem protocol stack 130. Alternatively, a packet may be sent directly to an RLP instance in the radio link protocol layer 132 in the modem protocol stack 130. If the packet is a PPP packet from the host interface 160, it may be decoded by the PPP module 12, processed to an IP packet, then encoded by the PPP module 127 for transmission to the modem 130.

The modem protocol stack 130 may receive the packet data from the IMS subsystem 120, including packet pointers (e.g., to the packet locations 192D, 192F, 192G in the packet buffer pool 170) and the RLPID for that flow. The RLP 132 may process the packet(s) and encode them for transmission. Thus, for example, the RLP might process and encode IP packets 193D, 193F, 193G to RLP packets 191D-191G. As shown, it is possible that the RLP 132 may fragment upper layer packets (e.g., IP packet 193D) into multiple RLP frames (e.g., RLP packets 191D, 191E), or may frame one or more upper layer packets in an RLP frame. This may depend on the reverse link grant available.

When the reverse grant is processed, the MAC/stream layer 134 may add its headers to the packet data. The PHY layer packets may then be transferred (e.g., by a DMA transfer) from the packet buffer pool 170 to the modem buffer memory 172, e.g., to be sent to a network.

ADVANTAGES OF THE INVENTION

The following is a list of advantages that may be gained according to various embodiments described herein.

The proposed Single IMS Call Controller may be a flexible and adaptable IP solution to any HRPD/EHRPD/LTE wireless modem, for a quick time-to-market IMS multimode terminal product.

The proposed framework may be extensible to any 3GPP/3GPP2 modem technologies.

The proposed generic interfaces between the IMS Call Controller subsystem and the Modem Protocol Stack may allow for easy integration into any vendor's 3GPP/3GPP2 modem.

There may be a generic interface from UI applications to the IMS call stack.

Memory resources may be saved by the proposed single IMS call controller, because of reduced code size and a common packet buffer pool.

The proposed QOS manager may consolidate and store QOS parameters for each IP flow, and manage QOS negotiations with the network, for all technologies.

The proposed QOS manager may perform QOS translations if seamless handoff occurs between different modem technologies.

With seamless handoff between EHRPD and LTE, Packet Call Setup times may be reduced.

The IMS Call Controller subsystem may be portable and may be implemented on any platform, such as on a separate Application Processor, or integrated on the on-board processor together with the Modem subsystem.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

The invention claimed is:

1. An IP multimedia subsystem (IMS) system configured for a plurality of modems, comprising:
 a processor; and
 a memory medium coupled to the processor, wherein the memory medium stores a routing table, and wherein the memory medium also stores program instructions executable by the processor to:
 receive a first application request that includes first quality of service (QOS) parameters and first connection information for a first application;
 store the first QOS parameters and the first connection information in the routing table according to a first QOS format;
 establish a first connection for the first application using a first modem among the plurality of modems based on the first QOS parameters and the first connection information, wherein the first connection utilizes a first communication technology based on the first connection information;
 receive a second application request that includes second quality of service (QOS) parameters and second connection information for a second application, wherein the second QOS parameters and the second connection information are different from the first QOS parameters and the first connection information;
 store the second QOS parameters and the second connection information in the routing table according to a second QOS format;
 establish a second connection for the second application using a second modem among the plurality of modems based on the second QOS parameters and the second connection information, wherein the second connection utilizes a second communication technology based on the second connection information; and
 if the second communication technology is not available and only the first communication technology is available, convert the second QOS parameters to the first QOS format in the routing table in order to request an appropriate QOS level using the first communication technology.

2. The IMS system of claim 1, wherein the first or second communication technology comprises one or more of:
 one times radio transmission technology (1xRTT);
 high rate packet data (HRPD)/enhanced high rate packet data (EHRPD); or
 long term evolution (LTE).

3. The IMS system of claim 1, wherein establishing the connection for the first application and the second application comprises utilizing a generic API to communicate with respective modems.

4. The IMS system of claim 1, wherein the program instructions are further executable to:
 modify the first QOS parameters in the routing table based on QOS parameters established during said establishing the first connection.

5. The IMS system of claim 1, wherein the first application and the second application comprises one or more of:
 telephonic communication; or
 data communication.

6. A method for managing connections in a mobile device, comprising:
 receiving a first application request that includes first quality of service (QOS) parameters and first connection information for a first application, wherein the first application is executing on the mobile device;
 storing the first QOS parameters and the first connection information in a routing table according to a first QOS format;
 establishing a first connection for the first application using a first modem based on the first QOS parameters and the first connection information, wherein the first connection utilizes a first communication technology based on the first connection information;
 receiving a second application request that includes second quality of service (QOS) parameters and second connection information for a second application, wherein the second QOS parameters and the second connection information are different from the first QOS parameters and the first connection information, and wherein the second application is executing on the mobile device;
 storing the second QOS parameters and the second connection information in the routing table according to a second format.
 establishing a second connection for the second application using a second modem based on the second QOS parameters and the second connection information, wherein the second connection utilizes a second communication technology based on the second connection information; and
 if the second communication technology is not available and only the first communication technology is available, converting the second QOS parameters to the first QOS format in the routing table in order to request an appropriate QOS level using the first communication technology.

7. The method of claim 6, wherein the first or second communication technology comprises one or more of:
 one times radio transmission technology (1xRTT);
 high rate packet data (HRPD)/enhanced high rate packet data (EHRPD); or
 long term evolution (LTE).

8. The method of claim 6, wherein establishing the connection for the first application and the second application comprises utilizing a generic API to communicate with respective modems.

9. The method of claim 6, further comprising:
 modifying the first QOS parameters in the routing table based on QOS parameters established during said establishing the first connection.

10. The method of claim 6, wherein the first application and the second application comprises one or more of:
 telephonic communication; or
 data communication.

11. A system, comprising:
 a plurality of modems; and
 an IP multimedia subsystem (IMS) system coupled to the plurality of modems, wherein the IMS system stores a routing table, the IMS system comprising:
 a processor; and
 a memory medium coupled to the processor, wherein the memory medium stores program instructions corresponding to a plurality of applications, and wherein the program instructions are executable to execute the plurality of applications;
 wherein the IMS system is configured to:
 receive a first application request that includes first quality of service (QOS) parameters and first connection information for a first application;
 store the first QOS parameters and the first connection information in the routing table according to a first QOS format;

establish a first connection for the first application using a first modem among the plurality of modems based on the first QOS parameters and the first connection information, wherein the first connection utilizes a first communication technology based on the first connection information;

receive a second application request that includes second quality of service (QOS) parameters and second connection information for a second application, wherein the second QOS parameters and the second connection information are different from the first QOS parameters and the first connection information;

store the second QOS parameters and the second connection information in the routing table according to a second QOS format;

establish a second connection for the second application using a second modem among the plurality of modems based on the second QOS parameters and the second connection information, wherein the second connection utilizes a second communication technology based on the second connection information; and if the second communication technology is not available and only the first communication technology is available, convert the second QOS parameters to the first QOS format in the routing table in order to request an appropriate QOS level using the first communication technology.

12. The system of claim 11, wherein the first or second communication technology comprises one or more of:
   one times radio transmission technology (1xRTT);
   high rate packet data (HRPD)/enhanced high rate packet data (EHRPD); or
   long term evolution (LTE).

13. The system of claim 11, wherein establishing the connection for the first application and the second application comprises utilizing a generic API to communicate with respective modems.

14. The system of claim 11, wherein the IMS system is further configured to:
   modify the first QOS parameters in the routing table based on QOS parameters established during said establishing the first connection.

15. The system of claim 11, wherein the first application and the second application comprises one or more of:
   telephonic communication; or
   data communication.

16. An IP multimedia subsystem (IMS) system, configured for a plurality of modems, comprising:
   a processor; and
   a memory medium coupled to the processor, wherein the memory medium stores a routing table, and wherein the memory medium also stores program instructions executable by the processor to:
      receive a first application request that includes first quality of service (QOS) parameters and first connection information for a first application;
      store the first QOS parameters and the first connection information in the routing table;
      establish a first connection for the first application using a first modem among the plurality of modems based on the first QOS parameters and the first connection information;
      receive a second application request that includes second quality of service (QOS) parameters and second connection information for a second application, wherein the second QOS parameters and the second connection information are different from the first QOS parameters and the first connection information;
      store the second QOS parameters and the second connection information in the routing table;
      establish a second connection for the second application using a second modem among the plurality of modems based on the second QOS parameters and the second connection information; and
      if the second communication technology is not available and only the first communication technology is available, convert the second QOS parameters to the first QOS format in the routing table in order to request an appropriate QOS level using the first communication technology.

* * * * *